3,531,727
SAMPLING RATE SELECTOR
Owen S. Hall, Sunnyvale, Calif., assignor to Automated Measurements Corporation, Los Gatos, Calif., a corporation of California
Filed Dec. 12, 1967, Ser. No. 689,857
Int. Cl. H03k 17/60
U.S. Cl. 328—151            12 Claims

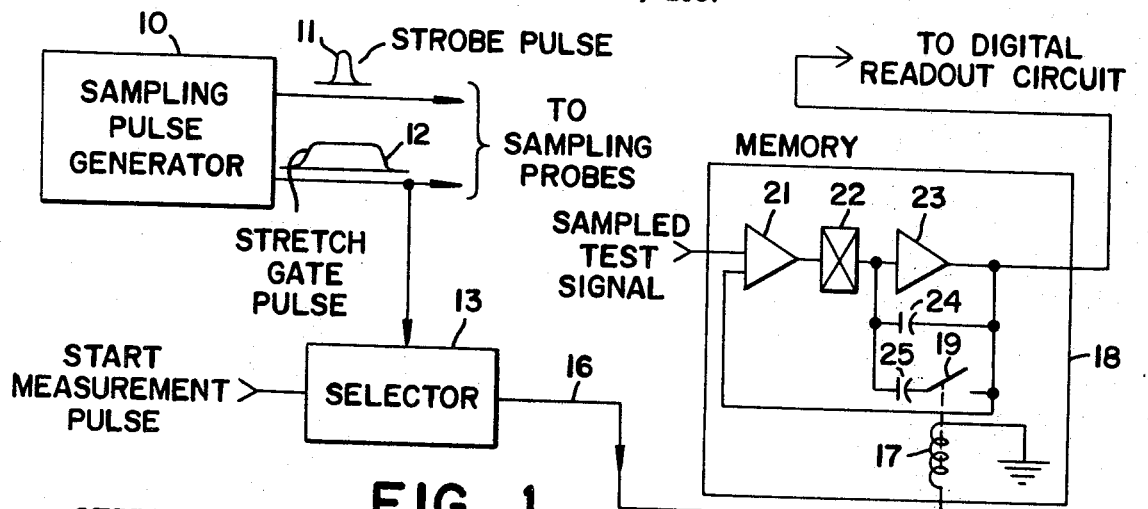
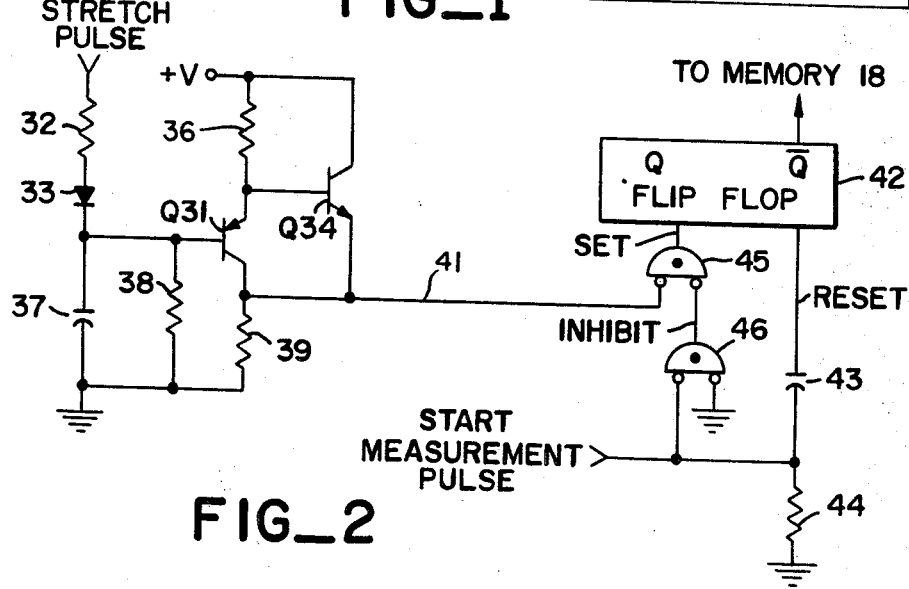
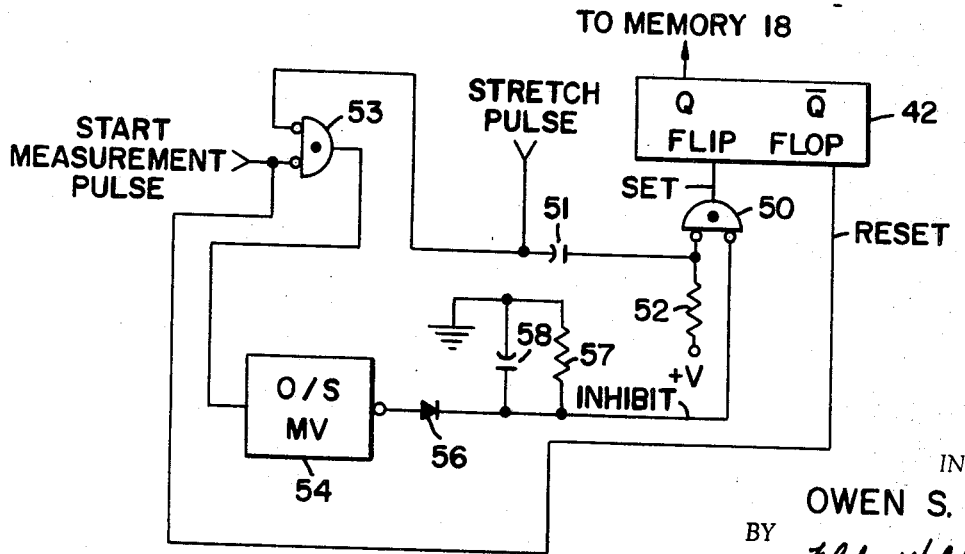

ABSTRACT OF THE DISCLOSURE

A sampling rate selector for conditioning the memory of a sampling system for either a fast sampling rate or a slow sampling rate. A switch in the memory switches a feedback capacitor in and out of an amplifier circuit to provide for the two different rates. Selector means actuates this switch and includes a flip-flop circuit responsive to the sampling rate, as represented by stretch pulses, for changing to one state or the other depending on the repetition rate of the stretch pulse. The flip-flop is inhibited for switching except during a start measurement pulse time. In one embodiment an integrating capacitor senses the pulse repetition frequency to set the flip-flop; in another embodiment a one-shot multivibrator sets up a predetermined time in which two of the stretch pulses must occur for switching to the fast rate.

BACKGROUND OF THE INVENTION

The present invention is directed to a sampling rate selector useful in a system for sampling periodic test waveforms.

In a typical sampling process, with each repetition of a signal the circuit measures one point or sample at a time slightly later than the last sample. This process of advancing the sampling time in fixed increments is called strobing. Such a system is disclosed in a copending application in the names of Samuel R. McCutcheon et al., Ser. No. 600,830, entitled Sampling System, filed Dec. 12, 1966 and assigned to the present assignee.

With the advent of integrated circuits and the need for speed and reliability of testing, a sampling system must be highly automated. One of the parameters of such a system is the sampling rate. It is desirable that the system automatically accommodate to changes in the sampling rate.

SUMMARY OF INVENTION AND OBJECTS

It is therefore a general object of the invention to provide a sampling system in which changes in sampling rate are automatically accommodated.

It is another object of the invention to provide a system as above in which such rate selection is accomplished in a simple and economical manner.

In accordance with the above objects there is provided a sampling system for sampling periodic test waveforms having a sampling rate variable between predetermined low and high frequency ranges. Memory means store the level of the test waveforms at selected times. Such memory means includes switching means having a first condition for the high frequency range of the sampling rate and a second condition for the low frequency range. Selector means are provided which are responsive to the sampling rate for actuating the switching means between its two conditions in accordance with the sampling rate.

DRAWINGS

FIG. 1 is a block diagram showing a sampling system incorporating the present invention;

FIG. 2 is a detailed schematic diagram of one embodiment of a portion of FIG. 1; and FIG. 3 is a schematic diagram of an alternative embodiment of a portion of FIG. 1.

DETAILED DESCRIPTION OF THE PREFERRED EMBODIMENTS

Referring now to FIG. 1, a sampling pulse generator 10 provides both strobe pulses 11 and stretch gate pulses 12 which are coupled to sensing probes for the purpose of sampling a test waveform. This is more fully described in the above mentioned McCutcheon et al., copending application. Stretch gate pulse 12 is for the purpose of expanding the sampled information to a larger time scale. However, both strobe pulse and stretch gate pulse 12 are of the same pulse repetition rate or frequency.

Stretch gate pulses 12 are coupled to a selector 13 which is responsive to the sampling frequency or pulse repetition rate of these pulses. This will be explained more fully in conjunction with FIGS. 2 and 3. Also coupled into selector 13 is a "start measurement pulse" which indicates to the system when to begin the test sampling of the test waveform. The output of selector 13 on line 16 drives a relay coil 17 which is a part of a memory circuit 18. Relay coil 17 activates a switch 19.

Memory 18 is for the purpose of storing a level of the input test signal waveform at selected times. For example, as explained in the above mentioned copending application the so called zero percent and 100 percent levels of a test waveform are useful in analysis of this waveform. The purpose of switch 19 is to condition memory 18 to receive the sampled test signal at a sampling rate which is either of a relatively high frequency range or a relatively low range. Switch 19 is open for a high sampling rate and is closed for a low sampling rate. The sampled test signal is coupled into an amplifier 21 to a switch 22 and then to a second amplifier 23 whose output is coupled to a digital readout circuit which is part of the overall waveform analyzing system of the sampling system. Amplifier 23 is shunted by both a capacitor 24 and a capacitor 25 which is in series with switch 19. Thus, in one condition of the switch 19 capacitor 25 is included in the circuit for one sampling rate and with switch 19 open it is excluded leaving only capacitor 24 for the other sampling rate. Switch 22 is closed at the times when selected samples are to be taken.

Referring now to FIG. 2 which is a detailed schematic of selector 13, stretch gate pulse 12 is coupled into the base of a transistor Q31 through a resistor 32 and a diode 33. Q31 in combination with a transistor Q34 form a pair of emitter follower connected transistor amplifiers. The emitter of Q31 is coupled into the base of Q34 and the combination is coupled to a positive voltage source, +V, through a resistor 36. The collector of Q34 is also coupled to the plus voltage source.

The repetition rate of the stretch pulse input is sensed by a resistance-capacitor combination which includes capacitor 37 in parallel with a discharge resistor 38 which are coupled from the base of transistor 31 to ground. The collector of Q31 is also coupled to the ground through a resistor 39.

The output of emitter follower transistors Q31, Q34 is on line 41 which is coupled from the emitter of Q34 and the collector of Q31 into a SET AND gate 45 of a flip-flop logic circuit 42. The output of the flip-flop is indicated as Q and $\bar{Q}$ terminals. With the setting of the flip-flop, "false" is placed on the $\bar{Q}$ terminal which is coupled to memory 18 as indicated in FIG. 1.

Flip-flop 42 also includes an inhibit input and reset input as indicated. The inhibit line is coupled to the other coincidence input of AND gate 45 and when high or true prevents any effective action by the set input terminal. This is the case since the two inputs of AND gate 45 are inverted. Thus, a set indication to flip-flop 42 is produced only with the coincidence of two "low" inputs. The reset input is coupled to the start measurement pulse through a capacitor 43 which is coupled to ground through a resistor 44. Inclusion of capacitor 43 in the reset circuit cause the flip-flop to be reset only momentarily in response to the leading edge of a start measurement pulse. The start measurement pulse is also coupled to the inhibit input through an inverter 46. Thus, there is an inhibit input into AND gate 45 at all times except during the start measurement pulse period. It is only during this pulse period that the flip-flop may be changed from one condition to another.

OPERATION

In the operation of the sampling system, the sampling pulse generator 10 (FIG. 1) is continuously generating stretch gate pulses 12. At a selected moment, the start measurement pulse indicates to the system when the actual measurement of the test waveform is to be accomplished. Thus, during this preparatory period, the stretch pulses have been charging capacitor 37 tending to cause transistors Q34 to supply a "HIGH" voltage to SET AND gate 45. This "HIGH" input to the AND gate would inhibit it. However, if the stretch pulse repetition rate is in a low frequency range, resistor 38 would discharge the capacitor so that a "low" condition occurs on line 41. Thus, the start measurement pulse when it is initiated would couple, by its leading edge, a reset pulse through capacitor 43 resetting the flip-flop to place a TRUE or high indication on the $\bar{Q}$ terminal of flip-flop 42 which signals a high frequency rate to memory 18. But, thereafter during the remainder of the start measurement pulse, AND gate 45 is enabled to set flip-flop 42 placing a false on $\bar{Q}$ to indicate the low frequency range.

Thus, in the embodiment of FIG. 2, the start measurement pulse always places the flip-flop 42 initially in the fast switching rate with a TRUE on $\bar{Q}$ and does not change to the low switching rate with a FALSE on $\bar{Q}$ unless activated by AND gate 45.

An alternative embodiment to FIG. 2 is shown in FIG. 3 and provides a more positive method of sensing the repetition rate of the stretch pulse. The same type of flip-flop 42 is provided. The stretch pulse input is coupled to a SET AND gate 50 through a capacitor 51. The capacitor is also coupled to a positive voltage through a resistor 52. The start measurement pulse input is coupled to the reset terminal of the flip-flop and in addition to a coincidence gate 53 which has as its other input the stretch pulse. The output of coincidence gate 53 is coupled to a one-shot multivibrator 54 which has its output coupled to the inhibit of AND gate 50 through a diode 56. Also coupled to the inhibit line is a storage circuit comprising a resistor 57 and a capacitor 58 in parallel with each other and tied between the inhibit line and ground.

Flip-flop 42 has its Q terminal coupled to memory 18 (FIG. 1).

In general, flip-flop 42 initially is set in a slow rate condition with the start measurement pulse resetting the flip-flop to place "FALSE" on Q. Basically, the timing or length of the one-shot pulse produced by multivibrator 54 is critical. In other words, if two stretch pulses occur within this one-shot time the flip-flop is set for a fast repetition rate; if not, it remains in its slow rate. This occurs since the inhibit line allows the set AND gate 50 to function only during the period that the one-shot multivibrator is activated. However, the first stretch pulse is not allowed to set the flip-flop with "TRUE" on Q because of the time delay introduced by the capacitor resistance circuit 57, 58. This provides a sufficient time delay so that the stretch pulse is no longer present. However, if during the period of the inhibit release caused by one-shot multivibrator 54 in combination with the storage of capacitor 58 another stretch pulse occurs, the set AND gate 50 will be activated through capacitor 51 setting the flip-flop to its high rate. Thus, the built in timing provided by multivibrator 54 provides a very definite demarcation between the low frequency repetition range of the sampling pulses represented by the stretch pulse and the high frequency range.

One advantage, of course, of the circuit of FIG. 3 is that the setting of flip-flop 42 takes place with as little as two stretch pulses after the start measurement pulse; in other words, the first stretch pulse, in combination with a concurrent set measurement pulse resets the flip-flop and starts the one-shot multivibrator, and the second stretch pulse then either occurs within the one-shot period to set the flip-flop or outside of this period causing the flip-flop to remain in its low repetition rate state. In comparison, in the first embodiment of FIG. 2, it is necessary that several stretch pulses be allowed to charge capacitor 37 to its proper value before the start measurement pulse is received. This, however, would normally be the case for ordinary measurements.

I claim:

1. In a sampling system for sampling periodic test waveforms having a sampling rate variable between predetermined low and high frequency ranges, memory means for storing the level of said test waveforms at selected times including switching means having a first condition for said high frequency range and a second condition for said low frequency range, and selector means responsive to said sampling rate for actuating said switching means between said two conditions in accordance with said sampling rate.

2. A sampling system as in claim 1 where said selecting means includes integrating means responsive to pulses having said sampling rate for causing said switch of said memory to switch to a predetermined one of said conditions if energy of a predetermined level is stored.

3. A sampling system as in claim 2 in which said integrating means includes a capacitor and a parallel coupled discharged resistance for providing said predetermined level.

4. A sampling system as in claim 2 in which said selector means include a logic flip-flop which is driven by said integrating means.

5. A sampling system as in claim 4 where said flip-flop is reset to an initial state by a start measurement pulse generated by said sampling system and thereafter is responsive to said predetermined level.

6. A sampling system as in claim 5 where said flip-flop is inhibited from changing to said predetermined state except during said start measurement pulse.

7. A sampling system as in claim 1 in which said selector means includes pulse forming means for forming a pulse of a predetermined time duration, said selector means switching said switching means to said high frequency range if said sampling rate has two sampling periods occurring with said predetermined duration.

8. A sampling system as in claim 7 including a bistable switching means included in said selector means which is coupled to said memory means and which is enabled to be switched to one of its predetermined bistable states substantially only during said time duration.

9. A sampling system as in claim 8 in which said pulse forming means is a one-shot multivibrator.

10. A sampling system as in claim 9 where said multivibrator is coupled to said bistable means through a time delay circuit.

11. A sampling system as in claim 10 where said time delay circuit is a resistance-capacitance type.

12. A sampling system as in claim 10 where said bitable means is a flip-flop which is reset initially by a start measurement pulse from the sampling system.

References Cited
UNITED STATES PATENTS

| | | | |
|---|---|---|---|
| 3,201,703 | 8/1965 | Becker | 328—151 XR |
| 3,210,573 | 10/1965 | Cooke-Yarborough et al. | 307—229 |
| 3,230,460 | 1/1966 | Tanter et al. | 328—151 XR |
| 3,333,109 | 7/1967 | Updike. | |
| 3,388,270 | 6/1968 | Davidoff | 307—247 XR |

STANLEY T. KRAWCZEWICZ, Primary Examiner

U.S. Cl. X.R.

307—228, 233, 246, 247; 324—78; 328—140